United States Patent [19]

Kuehnle

[11] 4,410,260

[45] Oct. 18, 1983

[54] TONING APPARATUS AND METHOD

[75] Inventor: Manfred R. Kuehnle, New London, N.H.

[73] Assignee: Coulter Systems Corporation, Bedford, Mass.

[21] Appl. No.: 328,809

[22] Filed: Dec. 9, 1981

[51] Int. Cl.³ .................... G03G 15/10; G03B 27/32

[52] U.S. Cl. .................................... 355/10; 118/661; 355/3 BE; 355/77; 430/117

[58] Field of Search ................. 355/10, 3 BE, 16, 77; 118/661; 430/117-119

[56] References Cited

U.S. PATENT DOCUMENTS

| | | | |
|---|---|---|---|
| 3,083,684 | 4/1963 | Carlson | 118/246 |
| 3,124,483 | 3/1964 | Rheinfrank | 118/637 |
| 3,241,957 | 3/1966 | Fauser et al. | 96/1 R |
| 3,577,259 | 5/1971 | Sato et al. | 117/37 |
| 3,618,567 | 11/1971 | Levy | 118/637 |
| 3,635,195 | 1/1972 | Levy | 118/644 |
| 3,672,326 | 6/1972 | Schulze | 118/8 |
| 3,687,708 | 8/1972 | Miller | 117/37 LE |
| 3,703,376 | 11/1972 | Gundlach et al. | 96/1 R |
| 3,707,139 | 12/1972 | Fukushima et al. | 118/637 |
| 3,713,422 | 1/1973 | Sato et al. | 355/10 X |
| 3,722,453 | 3/1973 | Dahlquist et al. | 118/246 |
| 3,750,624 | 8/1973 | Sato et al. | 355/10 X |
| 3,774,574 | 11/1973 | Sato et al. | 355/10 X |
| 3,778,841 | 12/1973 | Gundlach et al. | 355/16 X |
| 3,783,827 | 1/1974 | Fukushima et al. | 355/10 X |
| 3,796,187 | 3/1974 | Sato et al. | 118/637 |
| 3,830,199 | 8/1974 | Saito et al. | 118/644 |
| 3,831,556 | 8/1974 | Sato | 355/10 X |
| 3,843,252 | 10/1974 | Tanaka et al. | 355/16 |
| 3,862,619 | 1/1975 | Fukushima et al. | 355/10 X |
| 3,893,417 | 7/1975 | York | 355/10 X |
| 3,893,419 | 7/1975 | Bresnick | 118/637 |
| 3,913,524 | 10/1975 | Fukushima et al. | 118/637 |
| 3,921,580 | 11/1975 | Kase | 118/644 |
| 3,949,703 | 4/1976 | Smith | 118/637 |
| 3,952,702 | 4/1976 | Levy | 355/10 X |
| 3,972,305 | 8/1976 | Sato | 355/10 X |
| 4,045,217 | 8/1977 | Fujimura et al. | 355/10 X |
| 4,050,804 | 9/1977 | Silverberg | 355/10 |
| 4,262,998 | 4/1981 | Kuehnle et al. | 118/661 X |
| 4,264,199 | 4/1981 | Kuehnle | 355/16 X |

*Primary Examiner*—R. L. Moses

*Attorney, Agent, or Firm*—Silverman, Cass & Singer, Ltd.

[57] ABSTRACT

An apparatus and method for making copies of an original pattern through the use of electrostatic techniques in which there is a looped belt having an exterior photoconductive layer. The bottom reach of the belt is charged and imaged by the projected pattern in darkness to acquire a latent image progressively as the belt moves in one direction. The belt passes a toning station where a toning roller dipping into a sump picks up toner and rolls the toner onto the latent image to develop the same as the belt passes through the station. The roller protrudes into the belt loop past the plane of the bottom reach thereby requiring the belt to be wrapped around a peripheral segment of the toning roller, giving several advantages. After toning the developed image passes around to the upper belt reach and is transferred by pressure to a carrier medium at the end of the upper reach.

36 Claims, 4 Drawing Figures

SOURCE
MOTOR
A
-50 V.D.C.

TONING APPARATUS AND METHOD

FIELD OF THE INVENTION

The field of the invention comprises generally the development of electrostatic latent images by means of electrophoretic media. More particularly the invention is concerned with the development of an electrostatic latent image formed on a flexible electrophotographic belt by means of liquid toner. The invention is additionally concerned with the transfer of the developed image from the belt to a suitable transfer medium such as plain paper.

BACKGROUND OF THE INVENTION

The art of electrophotographic copying is well-developed, especially in the aspect of dry toner developing. In one such method a rigid drum of photoconductive material such as amorphous selenium is surface-charged by corona, exposed to a projected light or other radiant energy to achieve an electrostatic latent image, developed by electroscopic powder and the developed powder image is transferred by pressure to a carrier medium such as plain paper. The resulting transfer is normally fused by heat, pressure or application of both. The drum is cleaned and reused many times.

In another method known as electrofax, the electrophotographic member is a prepared flexible sheet of conductive paper or the like coated with a layer of photoconductive material such as zinc oxide in an organic matrix. The sheet itself is charged, exposed and passed through a bath of liquid toner, the toner particles in the suspension being selectively deposited upon the photoconductive layer. The image is dried and fused by heat and the entire sheet becomes the copy. This form of copying has been practiced decreasingly because of the preferred demand for plain paper copiers.

More recently the electrophotographic member has taken the form of an endless belt having an outer photoconductive layer and an interior ohmic or conductive layer that is grounded. The belt is engaged between a pair of rollers that are parallel and spaced apart to suspend the reaches of the belt between them. The belt surface is charged by corona means as the belt rotates, is exposed, toned and the developed image transferred to a member of plain paper. Both dry powder toner development and liquid toner development are known. The principal advantages of belt use are savings in space where the belt loop is fairly narrow, economy of construction and ease of replacement.

Reference may be had to U.S. Pat. Nos. 4,236,807; 4,259,005; and 4,264,199 for disclosure of a plain paper copier in which a belt loop is suspended between a pair of rollers, the charging is progressively effected at one end of the bottom reach, the exposing is effected also on the bottom reach, the developing is effected at the second end of the bottom reach by liquid toner. The developed image is brought around one roller to the top reach and the transfer is effected opposite the second roller.

This invention is an improvement over the just-described method and the apparatus thereof in that certain disadvantages of the just-described method and apparatus are diminished, if not eliminated. In addition certain benefits are achieved which were not achieved in said just-described method and apparatus. Some of the disadvantages diminished and benefits achieved will be mentioned hereinafter.

The width of the area along the length of the prior belt which was subjected to application of toner at any instant was extremely narrow, normally not much more than line contact. This established a requirement for a high surface potential in order to attract as much of the toner particles as possible in the short time of application.

According to the invention, the width of the area along the length of the belt which is subjected to toner application at any instant has been increased by an order of fifty times or more thereby decreasing substantially the required surface potential and the voltage demands upon the charging apparatus because the photoconductive surface need not be charged initially as high. In the prior apparatus the belt surface had to be charged to a surface potential of about 90 volts whereas with the invention the surface potential need only be of the order of 50 to 60 volts. These potentials are merely examples and will vary for different types of photoconductors. That which was used in the example was a crystalline sputtered cadmium sulfide about 2 microns thick on an ohmic layer of suitable metal.

In other belted copier apparatus the belt had to be maintained at very high tension in order to achieve positive drive for timing purposes and taut areas for exposure and toning. This increased the expense of bearings needed to support the belt. Rollers and shafts tended to bow in their centers because of the force applied.

According to the invention the tension of the belt at the toning station is increased by a unique application of force. The belt is diverted in a tortuous bow or jog spaced inwardly of the plane of the bottom reach thereby tensioning the belt locally with great force through amplification of a small force. The remainder of the belt is taut without superfluous stress so that economical bearings may be used for the support rollers and there is no bowing or bending of shafts.

A highly simplified method of replacing the belt results from the novel structure of the invention thereby solving a difficult problem with the prior device. This is achieved with the addition of no important components but is a dividend inherent in the inventive structure.

The invention has resulted in a toner application bias that is more uniform and efficient than the bias of prior devices and which has less tendency to spark because of the uniformity and power surface potential.

The apparatus of the invention enables the achievement of smaller and more uniform gaps than previously, both at the toning station and at the transfer station.

The invention is especially useful in the circumstance that the toner suspension has a greater viscosity than normal liquid toner suspensions. For example, the liquid toner which was usually used in the electrofax devices had a consistency almost like water with perhaps a surface tension even less than water because the liquid carrier was an insulating isoparaffinic hydrocarbon solvent. Typically such solvent is one of several types manufactured by the Exxon company and known by the trademark Isopar. The solvent is sold in various viscosities designated by characters of the alphobet, the viscosity being higher for the later characters. The electrofax Isopar solvent was normally type G or H with a viscosity of 1.00 or 1.3 centipoises, respectively, at 25° C. Such toner suspension would normally have 1% to 2% solids suspended therein.

A system and method have been devised which utilize the same type of hydrocarbon solvent but carrying 3% to 4% solids suspended. Such system and method are disclosed in a patent application Ser. No. 315,542 filed Oct. 27, 1981, in which the applicant herein is one the inventors and the application is owned by the assignee hereof.

The invention enables the use of a hydrocarbon carrier and diluent for the toner particles which has much higher viscosity than Isopar G or H. The hydrocarbon could have a viscosity as high as 2.46 centipoises at 25° C. and is commercially available as Isopar M. This solvent is capable of carrying substantially more than 4% solids. Thus the toner is effectively more viscous, is easier to "plate" upon rollers, enables greater densities of development, throws less sediment than previous viscous toners and is less aromatic.

In previous apparatus it was found best to use metering means such as a roller, doctor blade or other device to layer the toner uniformly across the toning roller which carries the toner against the moving belt. An extracting roller and an associated doctor blade were deemed of importance to trim excessive toner deposit from the developed image after passing through the toning station.

The effectiveness of the invention is such that no metering or extracting means are required. Instead, there is a single toning roller dipped into the toner liquid and carrying the same directly to the belt without the need for any intervening means or structure modifying the layer of toner brought to the belt by that single roller. Unquestionably, the resulting toning sump and roller means are greatly simplified over prior devices while being more effective.

Many other advantages result from the invention which can be ascertained by a study of the specification which follows. For example, the velocity of the belt with the new system can be increased over that which obtained previously. Using the system of said application Ser. No. 315,542, satisfactory copying was achieved with a belt speed of ten inches per second. Using the method and apparatus of the invention this speed can be materially increased without sacrifice of density and resolution. Accordingly the imaging cycle can be shorter and copies made faster.

It will be seen that the invention is described in connection with a copier of the so-called convenience type, but the invention is not limited to that example. It could be used in any environment where a developed image is transferred from a belt to a carrier medium. Thus the invention may be applied to color proofers, plate makers, etc. and the carrier medium can be plain paper, film or the like.

SUMMARY OF THE INVENTION

An apparatus and method for reproducing a pattern of predetermined subject matter on a carrier medium by transfer of a developed image to said carrier medium. The apparatus includes an endless belt arranged in a generally flat horizontal loop and engaged over a pair of end rollers, the belt adapted to move continuously during the imaging and transfer processes through the driving of one of said rollers. The belt has an outer layer presenting a photoconductive surface and an interior grounded ohmic layer.

The bottom reach is charged after passing around one roller at the beginning of its path; is imaged thereafter and enters a toning station at the end of its path just before the second roller. This is done with the belt moving at constant velocity. The toning station comprises a sump carrying a body of liquid toner therein and having an idling toning roller partially immersed in the body of toner suspension. The upper portion of the toning roller is located relative to the plane of the bottom reach of the loop of the belt to protrude into the loop thereby forcing the bottom reach to be diverted from its flat planar configuration to a tortuous bow or upward jog. A guide roller preserves the flatness of the remainder of the bottom reach up to the bow so that the jog is localized at the toning station and so that the belt is subjected to substantial tensile stress within the bow due to the geometry of the bow.

The toning roller is spring-biased against the belt so that the toner material it carries into the bow is evenly spread. It is also electrically biased to effect an efficient transfer of toner particles from the suspension to the latent image passing over the toning roller.

After development the image passes around the second roller, along the upper reach and back to the first belt roller where a sheet of carrier medium such as plain paper is fed into the nip of the belt and a transfer roller, the belt being backed by the belt roller. The transfer is effected as the carrier medium moves between the first belt roller and transfer roller in engagement with the belt. Assistance for transfer is provided by a transfer voltage that is maintained by a constant potential device.

DESCRIPTION OF THE PREFERRED EMBODIMENTS

Figures 1, 2, 3, 4:
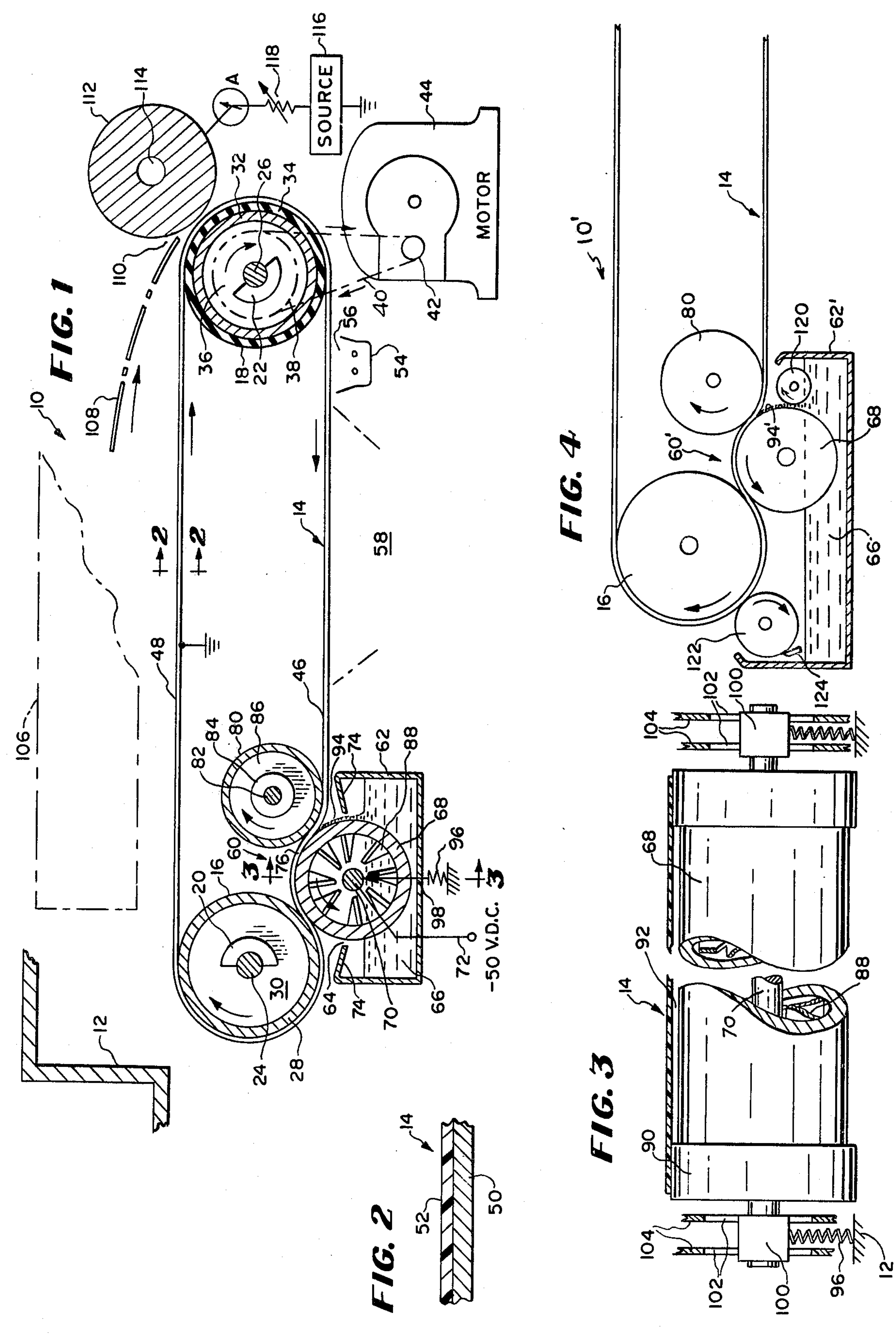
FIG. 1 is a generally sectional view, but primarily diagrammatic, taken through the belt and support therefor of a copier apparatus constructed in accordance with the invention and utilizing the method of the invention.
FIG. 2 is a fragmentary sectional view taken generally through the belt along the line 2—2 and in the indicated direction to show a typical belt construction.
FIG. 3 is a fragmentary diagrammatic side elevational view with portions shown in section, of the toner roller and the mounting therefor.
FIG. 4 is a highly simplified fragmentary diagram of a modified form of the invention.

The invention herein is concerned with a novel method and apparatus for toning the latent image produced on the belt of an electrophotographic copying device of the type known as a convenience copier, but is not necessarily limited thereto.

In such apparatus the principal benefit of the belt concept is to save space and achieve economy, the process contemplating that the belt is recirculated, as it were, the image being transferred from tne belt to a sheet of paper before the belt again passes to the charging station and the cycle is commenced again. The basic structural elements of the apparatus and the basic method are both known. Thus, there is a pair of rollers generally journalled in a framework, one of which is driven to move the belt in one direction. There is a charging station where the belt is progressively and uniformly charged, an exposure station or area where the charge is selectively discharged in some manner as by a projected pattern or the output of a store converted to a modulating light scanned to produce a latent image, a toning station where the latent image formed at the exposure station is developed and a transfer station where the developed image is transferred to a receptor, variously called a carrier medium or a plain paper sheet or member hereinafter.

Many of the requirements for optimum operation are those of all prior apparatus including that of the invention. For instance, charging, exposing and toning should occur as closely following one another as possible in order to achieve the least decrease in surface potential by dark decay before the toner particles are brought into adhering position with the latent image carried on the belt. Clearly there should be no interfering overlap between these steps. The exposure station should apply the projected or synthesized pattern to the belt surface preferably at a location where the belt is flat, this being especially true in the case of projected images, in order to decrease problems of optical aberration. Toning should be done at a location of the circuit of the belt where gravity may assist in disposing of surplus toner not adhering to the belt.

All of these requirements and others not mentioned are met and even exceeded by the invention because of the combination of components in the apparatus and the steps of the method.

Inviting attention to the drawings, in FIG. 1 there is illustrated a copier apparatus 10 in diagram form, the housing and framework 12 of which are indicated symbolically. An electrophotographic belt 14 is mounted in an endless flat loop as shown upon a pair of rollers 16 and 18 and maintained in taut condition thereon by means to be described. The roller axes are parallel and the rollers are journalled in suitable bearings 20 and 22 respectively, these bearings in turn being connected to the framework 12. Each roller is mounted on a shaft as shown at 24 and 26, respectively.

The roller 16 is an elongate cylinder having an outer wall 28 of metal and any suitable supporting end structure such as discs, one of which is indicated at 30. The roller wall 28 is grounded to the framework 12 through its shaft 24 and the bearing 20.

The roller 18 may have a construction similar to that of roller 16 and may have the same exterior diameter but this is not essential. In the structure illustrated, the roller 18 has an outer cylindrical wall 32 which carries a layer 34 of some frictional material such as an elastomer capable of yielding somewhat for a purpose to be described. The ends of the cylindrical wall 32 may be closed off by discs, one of which can be seen at 36.

The shaft 26 carries a sprocket wheel 38 which is spaced axially of the roller and is shown in broken lines in FIG. 1, the wheel 38 being connected to the shaft 26 and driven by a sprocket chain 40 that in turn is driven by a geared-down shaft 42 of the motor 44. It is to be understood that this configuration is only symbolic to keep the explanation simple. There may be other ways of rotating the roller 18 from a motor, either directly or indirectly. Also there will often be timing mechanisms to control the operation of the apparatus which may include the circulation of the belt. Direct and continuous driving of the belt is not unusual.

The rotation of the roller 18 by the motor 44 is seen to be in a clockwise direction, indicated by arrows. The belt 14 has a bottom reach 46 which thus moves to the left while its upper reach 48 moves to the right. The belt 14 is an electrophotographic member in that it is formed of layers that enable it to be charged and discharged. As seen in FIG. 2, the substrate 50 of the belt is a layer of conductive material such as metal and the exterior layer 52 is a chargeable photoconductor such as the crystalline cadmium sulfide mentioned previously. This material is preferably that disclosed in U.S. Pat. No. 4,025,339 and is such that it can be sputtered directly upon a metal substrate so that the belt can be formed of a strip of such material having its ends butt-welded together.

The reaches 46 and 48 are fairly parallel and maintained taut primarily so that the bottom reach may be exposed by a projected pattern and will accept such pattern without distortion. Of course, a scanning laser modulated with information from a store of a digitized pattern or patterns could also be used to expose the belt. The element 54 in FIG. 1 represents a charging corona device of some type which is located at the charging station 56 on the bottom reach 46 adjacent the roller 18. When the copier 10 is in operation, immediately after the belt 14 moves around the roller 18 and onto the bottom reach 46 it will be progressively and uniformly charged on the surface of the photoconductor 52 (which faces downward on the bottom reach) fully across that surface, the corona device 54 cooperating voltage-wise with the conductive layer of the belt.

The next station is indicated at 58 and this is the area along which the charged surface will be selectively discharged by the light of a projected image. The relative distance between the charging station 56 and the toning station 60 which follows the exposure station 58 will vary depending upon the manner in which the projection is effected. It can be relatively much shorter than shown.

As a practical matter the charging station 56 and exposure station 58 are very close together but there can be no "spill-over" of the corona from the charging station to the exposure station 58. The corona would interfere with the selective discharge if there were.

The toning station 60 is the important feature of this invention because it makes possible a much more effective operation of the copier 10. There is a sump 62 which is open at its top as shown at 64 and which contains a body of toner in suspension as shown at 66. A toning roller 68 is journalled for rotation in the sump 62 mounted on a shaft 70 which is insulated from the framework 12 and connected to a source of bias voltage by a suitable contact or the like as indicated at 72. In this case the bias voltage is shown to be minus 50 volts d.c. The lower portion of the roller 68 is immersed in the body 66 and its upper part protrudes from the opening 64, past the trough-like flanges 74 of the sump 62.

The lower reach 46 defines a horizontal plane which would normally extend from the bottom of the roller 18 to the bottom of the roller 16. According to the invention, the upper part of the roller 68 protrudes into and past that plane by a substantial degree at the toning station 60. Accordingly it pushes the belt upward in a jog or bow 76 and causes the belt at this point to take a tortuous turn and be wrapped around the outer surface of the roller 68 to a substantial extent. The reach 46 to the right of the toning station 60 is maintained in a flat planar condition substantially for the entire extent to the roller 18 by means of a guide roller 80 that is smaller in diameter than the rollers 16 and 18 in order to enable its being mounted on the interior of the loop formed by the belt.

The guide roller 80 is mounted to a shaft 82 which in turn is journalled in the bearings 84 that are carried by the framework 12, the ends of the roller 80 having discs such as 86 closing the same.

The toner roller 68 has blades 88 on its interior which serve to agitate the body 66 of toner suspension during the rotation of the roller. The ends of the roller 68 are provided with annular collars 90 of metal or other conductive material, these collars having a diameter which is perhaps ten microns greater than the diameter of the main body of the roller 68. This is seen in FIG. 3 where the result of this arrangement produces a very narrow gap 92 between the belt 14 and the roller 68 at the bow 76. This gap will retain the toner and ensure that there is a uniform layer of toner in the toning station 60. The toner particles are picked up by the surface of the roller 68 as it emerges from the body 66 in a "plating" 94 carried by the roller into the gap 92 where this "plating" is flattened and spread evenly. This action renders the toning bias more effective than in instances where the area of contact is less.

In FIG. 1 there is a symbol at 96 which represents a compression spring and an arrow 98 pointing upward toward the shaft 70. This is to indicate that the shaft 70 and hence the roller 68 is biased upward also, tightly against the tortuous bow 76 bringing the interior surface of the belt 14 tightly into engagement with the rollers 16 and 80 and applying a high tensile stress to the belt in the bow. It is this tension which maintains the belt taut without the need for placing undue stress on the bearings 20 and 22. The physical nature of this type of force, that is the lateral force exerted by the spring 96 upon the belt 14, and the resulting tension in the sides of the bow 76 is well-known. A small force at 96 is substantially amplified to achieve the desired tension in the belt to maintain the belt taut.

The toning roller 68 need not be driven because the area of contact of the surface with the moving belt 14 achieved with the intervening layer of wet toner is so large that the shear strength of the liquid prevents slipping.

The toning roller 68 is therefore pulled along by the belt and rotates substantially in synchronism therewith.

It is feasible to drive the toning roller 68 by a motor such as the same motor 44 to synchronize its rotation more closely with movement of the belt 14. The belt itself may be coupled directly to the toning roller 68.

The means for biasing the toning roller 68 to enter the loop of the belt 14 and apply continuous upward pressure thereon are shown symbolically in FIG. 1. In FIG. 3 a form of contrivance for this purpose is illustrated in somewhat more detail. The shaft 70 is journalled in the bearings 100 each of which is mounted in the slots 102 of vertical standards 104 that are connected with the framework 12. Springs 96 press the bearings 100 upward thereby providing the required force which has been described.

In FIG. 1 there is a block shown in broken lines at 106. This is intended to represent a store of carrier medium such as sheets of plain paper. One such sheet is shown at 108, having been stripped out of the store 106 and being directed to the nip 110 between a transfer roller 112 mounted on the shaft 114 which is parallel to the shaft 26 and spaced therefrom such that the gap between the belt 14 as it makes the turn around the roller 34 and the transfer roller 112 is somewhat less than the nominal thickness of the paper member 108. A normal thickness of plain paper is about 0.003 or 0.004 inch and in this case the spacing between the roller 12 and the belt 14 would be about 0.002 inch. The belt itself may have a total thickness of about five or six thousandths, the principal thickness being contributed by the substrate since the photoconductive layer 52 is normally about two microns thick or less. In the case of sheet metal substrates the thickness of 5 thousandths provides strength and facilitates welding the ends of the belt together. In the case that the substrate is an organic polyester, which is disclosed in said U.S. Pat. No. 4,025,339 the total thickness of the belt 14 could be about 0.004 inch. There would be an ohmic layer sandwiched between the substrate and the photoconductive layer in such case thereby providing three layers to the belt.

When the receptor member 108 is passed into the nip 110, the elastomeric surface 34 will frictionally grip the same and force it through the gap even though the gap is slightly less in thickness than the paper. The surface 34 yields slightly so that there is substantial pressure applied to the receptor 108 and the belt 14. The developed image is therefore more likely to be transferred completely to the receptor 108. A transfer voltage is applied between the transfer roller 112 and the belt 14, the substrate 50 of the belt 14 being grounded and the shaft 114 carrying the roller 112 being insulated from ground. The transfer voltage is a positive voltage of the order of 100 volts and is maintained at a suitable value by a constant potential source of voltage 116 which is controlled by a variable resistor 118.

In FIG. 4 there is illustrated a variation of the invention in the form of a toning station 60' of a copier device 10' only a portion of which is shown in diagrammatic form. The function and construction of the rollers 16, 80 and 68 are the same as in the copier 10. In this version of the invention there are metering means and extracting means which comprise options which can be used with the basic structure of FIG. 1. The metering means comprise a roller 120 that is located in the sump 62' to control the thickness of the "plating" of toner 94' that is carried by the surface of the roller 68 as it emerges from the bath or body 66 of toner. The extracting means comprise a roller 122 which is mounted adjacent the roller 16 spaced therefrom to form an extraction gap and located in such a manner that the doctor blade 124 that removes excess toner therefrom will drop the toner by gravity into the body 66 of toner. The extraction roller 122 is driven in a direction opposite to that of the belt so that it can shear off surplus toner which may have been taken on by the developed image in passing through the toning station. The spacing between the extraction roller 122 and the belt 14 will be of the order of 0.001 inch which is greater than the normal thickness of the toner carried by the developed image.

It is emphasized that the structure of the invention does not require extraction means or metering means. These are just options which can, in some cases, improve the results to be obtained by the apparatus.

The mounting for the shaft 70 is preferably manually movable in a downward direction against the bias of the springs 96 and may be provided with means for locking the bearings 100 temporarily in the position where the roller 68 is not pressing upward. As can be appreciated, the result is that the belt 14 will be suspended loosely over the rollers 16 and 18 and will most likely not even engage the roller 80. In this condition of the apparatus, it is a simple matter to slide the belt 14 off the rollers to replace the same.

Even the rollers 16 and 18 can be mounted in a manner which enables them to be readily removed. Because of the nature of the applied tension all that is required to journal the rollers 16 and 18 are half bearings as shown.

The bearing 22 is tilted so that the pressure applied by the transfer roller 112 will be fully accomodated. When the belt has been removed the rollers 16 and 18 can also be readily removed and replaced.

One advantageous effect of the invention is that the toning roller 68 need not be associated permanently with the sump 62. It can conveniently be mounted on the same support as the rollers 16 and 80.

In the ordinary belt type of copier the toning is effected by means of a roller engaging the latent image on a line contact. Thus, there is very little time for the toner to act upon the latent image and as a result the mean surface potential of the image is desirably as high as possible. As mentioned, under the same general conditions prevailing for an apparatus which uses the same belt as described but with a line contact for toning it was necessary to have a charge potential of about 90 volts with a mean surface potential for the latent image correspondingly high. Because the contact between the toning roller 68 and the belt 14 has been increased in area along the arcuate upper surface of the toning roller 68 the toner has more time to be attracted by the charged portions of the latent image and will be in the field produced by the bias much longer and hence much lower charge voltages of the order of 50 volts and less can be used.

Looking at the drawing, which is a typical example, it can be seen that the tortuous bow 76 causes the belt 14 and hence the latent image on the bottom reach of the belt to engage the upper periphery of the toning roller 68 over about 90° more or less. This segment can vary with the geometry of different forms of the invention but it is manifest that the toning contact is vastly greater than that of any apparatus using only a line contact. Obviously there will be a strip of contact due to capillarity of the toner even in line contact, but the efficacy of the field of the toning bias falls off on opposite sides of the contact when the belt and toning roller are separated by as little as 0.004 inch. This emphasizes the advantage of the invention and points to the unobvious use of an arcuate contact over a very large area where the field is uniform and in effect.

The concept of the invention which relates to the positioning of the toning roller so that it protrudes into the flat configuration of a loop reach may be applied equally to other types of toner material besides viscous toner with advantage. Use with viscous toner is preferred. The basic advantage is the achievement of a large area of toning contact.

Variations in the details of the invention can be made without departing from the spirit or scope thereof as defined in the appended claims.

What it is desired to secured by Letters Patent of the United States is:

1. A method of toning the latent image formed on the exterior of a looped electrophotographic belt having a photoconductive layer on its exterior surface, said belt extending between two parallel support rollers and there being a generally flat planar bottom reach extending tangentially between the support rollers and in which the latent image is formed on the exterior surface of the bottom reach and is adapted to be passed toward one of the said support rollers, there being a toning station adjacent said one support roller through which the latent image is required to pass before reaching said one support roller, said method comprising:

A. providing a sump at said toning station, said sump containing a body of toner liquid and a toning roller having an axis parallel with the axes of said support rollers, the lower portion of said roller being immersed in said body of toner liquid, B. pressing said toning roller upward while still in said body of toner liquid toward said bottom reach to such an extent that the upper portion of said toning roller intrudes past the plane of said planar reach and engages said belt in a tortuous inward bow, a substantial area of said reach being so engaged with an arcuate area of said upper portion of said toning roller, C. driving one of said support roller to cause movement of said belt to bring the latent image into said toning station and rotating the toning roller in synchronism with the movement of said belt, such toning roller acting to pick up toner liquid from said body bringing it into said arcuate area between said toning roller and said bottom reach as the belt passes over the toning roller whereby to develop the latent image and D. pressing the bottom reach adjacent the bow on the side thereof opposite said one support roller in a direction opposite to the direction in which the toning roller is pressing the bottom reach to force the part of said bottom reach not included in said bow to return to said flat planar condition in said plane.

2. The method as claimed in claim 1 in which a toning bias is applied to said toning roller between said roller and the belt while said latent image is passing through the toning station.

3. In an apparatus for reproducing a pattern of predetermined subject matter on a carrier medium by transfer of a developed image to said carrier medium and in which said apparatus includes an endless electrophotographic belt having an outer photoconductive surface, a pair of parallel first and second belt supporting rollers and at least one of the first and second rollers having means for rotating the same and circulating the belt in a direction, said belt being formed in a flat loop engaged over the rollers and having a bottom reach and an upper reach, the bottom reach defining substantially a flat plane tangent to the bottoms of the supporting rollers, a charging station on the bottom reach adapted to charge an area of the bottom reach, an exposure station on the bottom reach following the charging station in the direction of movement of the bottom reach, a toning station following the exposure station below the bottom reach adjacent the second supporting roller, the exposure station adapted selectively to discharge the charged area of the bottom reach after charging by the charging station to form a latent image on the bottom reach and the toning station adapted to develop the latent image, a store of carrier medium and means for bringing a member of carrier medium to the top of the first support roller, the developed image adapted to move around the second support roller on the belt and along the upper reach to said first support roller and a transfer roller associated with said first support roller and forming a nip therewith, the member of carrier medium adapted to be moved into said nip between the transfer roller and first support roller and have pressure applied thereto to effect transfer of the developed image to said member of carrier medium before the belt returns to the bottom reach, the invention herein which comprises:

said toning station including a sump having a body of toner liquid and a toning roller partially immersed therein, the upper portion of said toning roller protruding into said flat loop past the said flat plane and forming a tortuous bow in said bottom reach which engages the toning roller along a substantial arcuate area thereof, the movement of the belt serving to rotate the toning roller in the body of liquid bringing toning liquid on its surface out of said sump and between the arcuate area and the belt whereby to develop the latent image as it passes through the toning station.

4. The invention as claimed in claim 3 in which there is a guide roller disposed within the loop alongside of the tortuous bow and serving to force the portion of the bottom reach to remain in said plane outside of said bow.

5. The invention as claimed in claim 3 in which the toning roller is spring biased to press upward against the belt.

6. The invention as claimed in claim 4 in which the toning roller is mechanically biased to press upward against the belt.

7. The invention as claimed in claim 3 in which there is an electrical bias applied to said toning roller to assist in the transfer of toner to said latent image as the belt passes.

8. The invention as claimed in claim 4 in which there is an electrical bias applied to said toning roller to assist in the transfer of toner to said latent image as the belt passes.

9. The invention as claimed in claim 3 in which the first supporting roller has an elastomeric surface.

10. The invention as claimed in claim 9 in which the transfer roller is spaced from the first supporting roller by a gap less than the thickness of the member of carrier medium.

11. The invention as claimed in claim 3 in which there is a transfer voltage applied to said transfer roller and means are provided to maintain said voltage at a constant value.

12. The invention as claimed in claim 3 in which means are provided to meter the toner being brought out of said sump by said toning roller.

13. The invention as claimed in claim 4 in which means are provided to meter the toner being brought out of said sump by said toning roller.

14. The invention as claimed in claim 3 in which means are provided to extract excessive toner from the developed image after the said developed image has been produced at said toning station.

15. The invention as claimed in claim 4 in which means are provided to extract excessive toner from the developed image after the said developed image has been produced at said toning station.

16. The invention as claimed in claim 6 in which there is an electrical bias applied to said toning roller to assist in the transfer of toner to said latent image as the belt passes.

17. The invention as claimed in claim 6 in which means are provided to meter the toner being brought out of the sump by said toning roller.

18. The invention as claimed in claim 6 in which means are provided to extract excessive toner from the developed image after the said developed image has been produced at said toning station.

19. The invention as claimed in claim 3 in which the means for rotating said one belt supporting roller are also coupled to rotate said toning roller in synchronism with movement of said belt.

20. The invention as claimed in claim 3 in which the toning roller is idling with respect to said belt and is adapted to be coupled with said belt to rotate therewith by the shear strength of liquid toner engaged between said arcuate area and the belt.

21. An apparatus for reproducing a pattern of predetermined subject matter on a carrier medium by transfer of a developed image to said carrier medium, said apparatus comprising A. an endless electrophotographic belt of flexible material having an outer photoconductive surface and being formed into a loop, B. a pair of parallel first and second belt supporting rollers and at least one of said first and second supporting rollers having means for rotating the same and circulating the belt in a direction, the belt being supported over the supporting rollers in a normally stretched and tensioned condition whereby to form said loop, said loop being of generally flat configuration and having upper and lower reaches, C. a charging station and an exposure station arranged in that order along the loop in the direction of belt movement, the charging station having means for charging the photoconductive surface of said belt across its entire width progressively as the belt moves to said exposure station, said exposure station having means thereafter selectively to discharge the charge which has been placed on the belt by exposure to radiation in the form of said pattern of predetermined subject matter whereby to produce a latent electrostatic image on said photoconductive surface of said belt, D. a toning station following the exposure station in the direction of movement of the belt, said toning station adapted to apply toner to said latent image to tone the same, said toning station including i. a store of toner material located adjacent one of the reaches ii. a toning roller disposed to have one portion engage in said store and adapted to rotate in substantial synchronism with the movement of the belt and arranged to pick up toner material from said store on its surface as said toning roller rotates, iii. said toning roller having a second portion thereof which protrudes from said store and into said loop to form a tortuous bow offset inwardly of the flat configuration of said one of said reaches engaging said one of said reaches along a substantial arcuate area of said toning roller and a similar area of said belt, iv. the toning roller serving to bring toner material from said store and between said arcuate area and similar area of the belt whereby to develop the latent image as it passes through the toning station by passing the toner material from the toning roller to the latent image on the belt, E. a store of carrier medium and means for bringing a member of carrier medium into engagement with said belt after development of said latent image and for applying pressure thereto for effecting transfer of the developed image to said member of carrier medium and F. means for ejecting said member of carrier medium from said apparatus following transfer of said developed image thereto.

22. The invention as claimed in claim 21 in which a guide roller is disposed within said loop adjacent the tortuous bow whereby to retain the remainder of the said one of said reaches including said tortuous bow in substantially flat configuration.

23. The invention as claimed in claim 22 in which the store is in a sump, the toner material comprises liquid toner, said one of said reaches is the bottom reach, and the store of carrier medium and pressure applying means are located above the upper reach.

24. The invention as claimed in claim 21 in which means are provided spring-biasing the toning roller into engagement with the belt whereby to maintain the tension of the belt.

25. The invention as claimed in claim 22 in which means are provided spring-biasing the toning roller into engagement with the belt whereby to maintain the tension of the belt.

26. The invention as claimed in claim 24 or 25 in which said spring-biasing means are capable of being adjusted to relieve the pressure of said toning roller against said belt thereby loosening said belt to enable removal of said belt from said supporting rollers.

27. The invention as claimed in claim 24 or 25 in which the toning station has an electrical toning bias between the toning roller and the belt to assist in the transfer of toner material to said belt while the latent image is being developed.

28. A method of toning the latent image formed on the exterior of a looped electrophotographic belt having a photoconductive layer on its exterior surface, said belt extending between and looped around a plurality of rollers supporting the same including two spaced apart rollers, the belt moving in a reach between the two spaced apart rollers which would define a flat tangential plane if passed directly between the two rollers without being disturbed, in which the latent image is formed on the belt and appears on the exterior surface of each reach and is adapted to pass along said reach toward one of the two spaced apart support rollers, there being a toning station adjacent said reach and located between the two spaced apart support rollers, the latent image being required to pass through said toning station before passing around said one support roller, said method comprising:

A. providing a sump at said toning station, said sump containing a body of toner material and a toning roller having its axis parallel with the axes of said support rollers, one portion of said toning roller being engaged in said body of toner material, B. pressing the toning roller while still in said body of toner material toward said reach to such an extent that a second portion of said toning roller circumferentially spaced from said one portion intrudes past the said plane inwardly of the loop and engages said belt in an inward bow offset from said plane, a substantial area of said reach being so engaged with an arcuate area of said second portion of said toning roller, C. driving one of said plurality of rollers to cause movement of said belt to bring the latent image into said toning station and D. rotating the toning roller in substantial synchronism with the movement of the belt, such toning roller acting to pick up onto said one portion of its surface toner material from said body bringing it into said arcuate area between said toning roller and the reach as the belt engages said second portion of said toning roller whereby to develop the latent image as the belt passes through the toning station.

29. The method as claimed in claim 28 in which simultaneously with pressing the toning roller into said inward bow a toning bias voltage is applied to said toning roller between the toning roller and the belt of such polarity as to drive the toner material into development relationship with the latent image on the belt.

30. The method as claimed in claim 28 or 29 in which the part of said reach between the inward bow and the other of said two spaced apart rollers is pressed in a direction which is opposite to the direction in which said toning roller is pressed whereby to tend to return the reach toward the said plane.

31. An apparatus for reproducing a pattern of predetermined subject matter on a carrier medium by transfer of a developed image to said carrier medium, said apparatus comprising:

A. an endless electrophotographic belt of flexible material having an outer photoconductive surface and being formed in a loop, B. at least two belt supporting rollers engaged by said belt and effective to carry a portion of said loop between them in tensioned condition, said belt adapted to move between said rollers in a plane tangential to both rollers if permitted to do so without being deviated out of said plane, C. means for moving the belt in its loop and circulating same in one direction, D. a charging station and an exposure station arranged in that order along the loop in the direction of belt movement, the charging station having means for charging the photoconductive surface of said belt across its width progressively as the belt moves to said exposure station, said exposure station serving thereafter selectively to discharge the charge which has been placed on said belt by exposure to radiation in the form of a pattern of predetermined subject matter whereby to produce a latent electrostatic image on said photoconductive surface of said belt, E. a toning station following the exposure station in the direction of movement of said belt, said toning station adapted to apply toner to said latent image to tone the same, said toning station including i. a store of toner material located adjacent said tangential plane and between said belt support rollers;

ii. a toning roller disposed to have one portion engage in said store and adapted to rotate in substantial synchronism with the movement of the belt and arranged to pick up toner material from said store on its surface as said toning roller rotates;

iii. said toning roller having a second portion thereof which protrudes from said store and through said tangential plane engaging said portion of said loop between said rollers and deviating the belt from said tangential plane to produce a bow in the loop on the interior thereof, the engagement between the belt and toning roller being along a substantial arcuate area, iv. the toning roller serving to bring toner material from said store and between the belt and toning roller in said arcuate area whereby to develop the latent image as it passes through the toning station by transferring the toner material from the toning roller to the latent image on the belt, v. there being means for pressing the toning roller into engagement with said belt, and E. a source of carrier medium and means for bringing the carrier medium from said source and moving same into engagement with said belt after development of said latent image and for effecting transfer of the developed image to said carrier medium as it moves into engagement with said belt, said means serving to move said carrier medium with the transferred image out of engagement with said belt after transfer.

32. The apparatus as claimed in claim 31 in which said belt has means for opposing the deviating action of said toning roller but acting on said belt at a location adjacent said toning roller between said toning station and exposure station but against the interior of the belt whereby to tend to urge the belt between toning station and one of said support rollers to move into said plane.

33. In an apparatus for toning a latent image in which there is a belt having an exterior photoconductive surface moving in a loop which includes a portion of said loop extending between a pair of belt supporting rollers, said pair of rollers defining a plane tangential to both through which the belt would move if not deviated between said rollers, the belt adapted to be charged at a charging station, thereafter exposed at an exposure station to produce a latent image on the belt, the belt adapted thereafter to carry said latent image into said portion between said pair of belt supporting rollers, there being a toning station between said pair of belt supporting rollers for toning said latent image as said latent image passes between said pair of belt supporting rollers along said belt, and there being a developed image transfer station for transferring the toned image to a carrier medium, the herein invention which comprises: said toning station including a store of toner material having a rotating toning roller with one arcuate area engaging said toner material and a second arcuate area engaging the belt in said portion of said loop while extending through said plane and deviating the belt from said plane to follow said second arcuate area whereby toner material will be picked up from said store and transferred to said belt to develop said latent image as it passes along said second arcuate area, the toning roller rotating substantially in synchronism with said moving belt and maintaining said belt in tension between said pair of belt supporting rollers.

34. The invention as claimed in claim 33 in which means are provided for coupling the belt to the toning roller for driving the toning roller.

35. The invention as claimed in claim 33 in which an auxiliary roller is provided adjacent the toning roller but engaging the opposite surface of the belt for guiding the belt in said plane before it reaches said toning station.

36. The invention as claimed in claim 33 in which means are provided for applying an electrical toning bias between the toning roller and the belt.

* * * * *